United States Patent [19]

Mentuch

[11] Patent Number: 4,742,957
[45] Date of Patent: May 10, 1988

[54] HEAT RECOVERY VENTILATOR

[76] Inventor: Stephen Mentuch, 390 Harvey Avenue, Toronto, Ontario, Canada, M6T 4L8

[21] Appl. No.: 778,009
[22] Filed: Sep. 20, 1985
[51] Int. Cl.$^4$ .............................................. F24F 7/00
[52] U.S. Cl. ....................................... 237/46; 165/66
[58] Field of Search ..................... 237/46, 55; 98/32; 165/66, 901, 4; 62/407, 410, 418

[56] References Cited
U.S. PATENT DOCUMENTS 3,865,184 2/1975 Grover .............................. 165/66 X
4,142,575 3/1979 Glancy .............................. 165/66 X
4,184,538 1/1980 Rauenhorst ......................... 165/66

Primary Examiner—Henry A. Bennet
Attorney, Agent, or Firm—Eugene J. A. Gierczak

[57] ABSTRACT

A heat recovery unit for use in association with a fluid distribution system including: a heat exchanger; means to: circulate fluid through said system and to introduce fresh fluid across one end of said heat exchanger and into said system for mixing with the circulating fluid; ventilate a portion of the circulating fluid across the other end of said heat exchanger to transfer the thermal energy between said ventilated fluid and said fresh fluid so as to replenish said ventilated fluid with said fresh fluid.

14 Claims, 5 Drawing Sheets

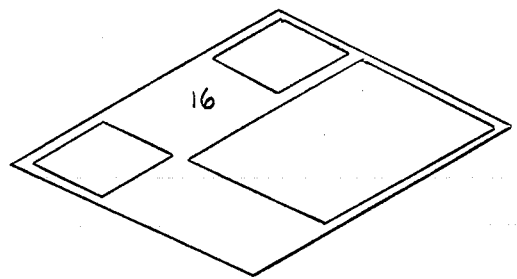
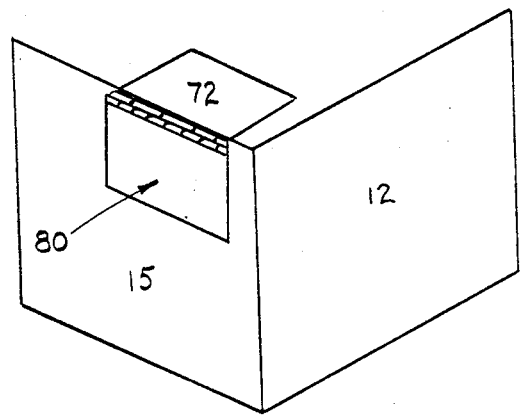
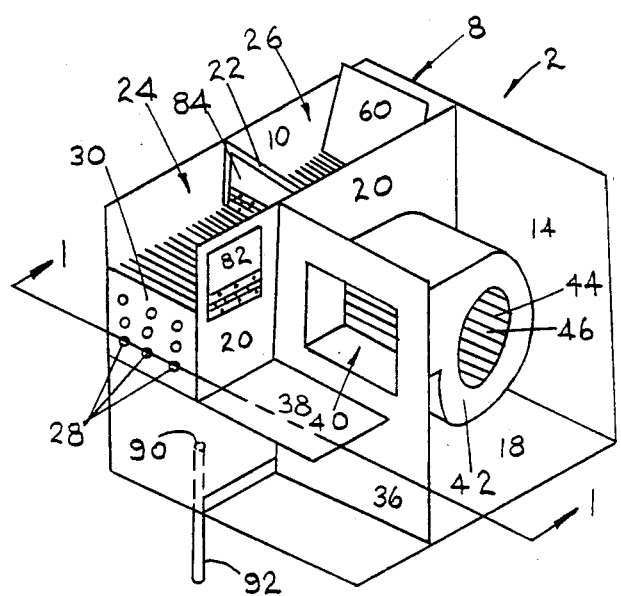
Figure 2

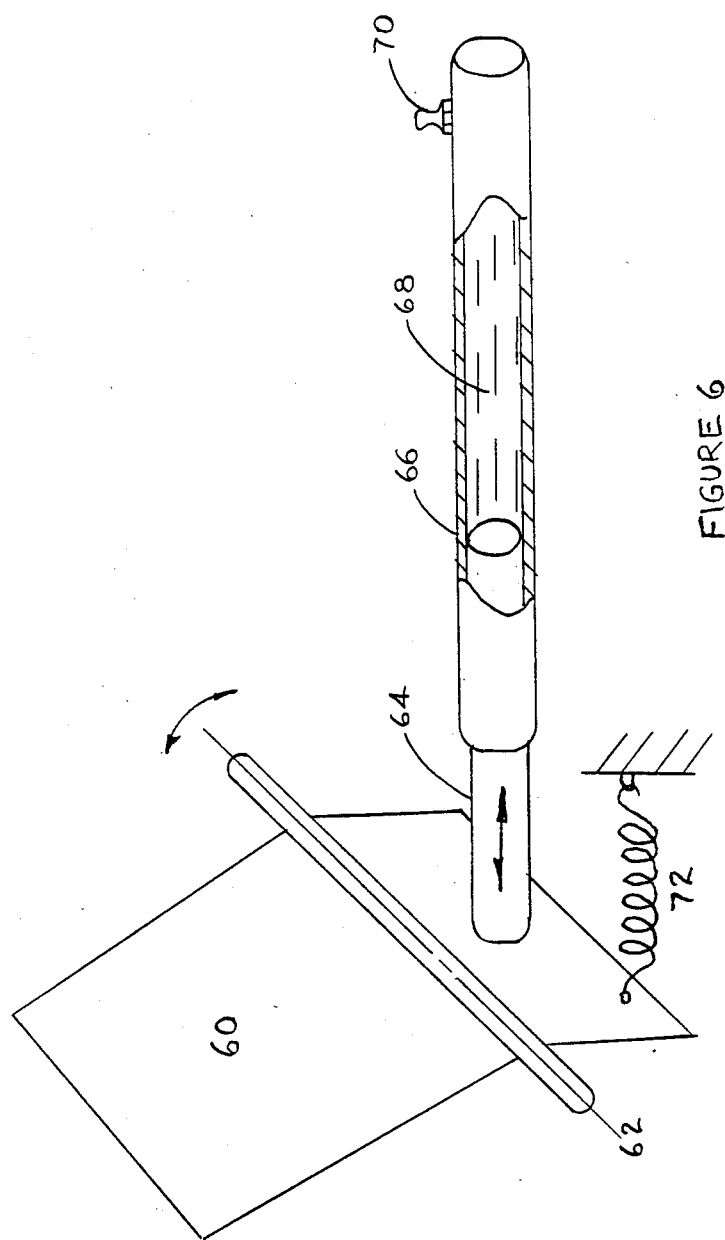

4,742,957

HEAT RECOVERY VENTILATOR

BACKGROUND OF THE INVENTION

1. Field of Invention

This invention relates generally to a heat recovery unit for use in association with a fluid distribution system, and more particularly to a heat recovery ventilator for use in association with a central air distribution system such as a forced air heating system or air conditioning unit within a home or office.

2. Description of the Prior Art

Central air distribution systems are commonly used in commercial buildings or in residential homes. Such central air distribution systems comprise of a series of hot air ducts and cold air return ducts connected to a furnace. The furnace heats the air and a blower fan located in the furnace circulates the same through the hot air ducts, throughout the office or home, while the cold air ducts collect the cold air within the office and home and return the same to the furnace for heating.

It should be noted that air conditioning units are commonly connected to the furnace so that during the hot season, the air conditioner cools the air and a blower fan forces same through the hot air ducts throughout the office or home, and the hot air is returned through the cold air return ducts to the air conditioner for cooling.

In either the heating or cooling procedures outlined above, the circulated air becomes "stale", particularly in modern homes of offices which have been efficiently insulated so as to prevent any drafts of hot or cold air between windows, doors, ceilings or the like.

However, when ventilating a portion of the circulated air in the central air distribution systems with fresh air, heat energy or thermal energy losses occur. In the case of ventilating some hot air and replenishing same with fresh air, from the environment heat energy losses occur. In the case of ventilating air conditioned air with fresh air from the environment, heat energy losses occur.

Apparatus and various methods have been devised to transfer thermal energy from one source to another.

For example, Canadian Pat. No. 1,035,766 discloses a thermal transfer system which comprises a sealed plate containing a working fluid which is alternatively evaporated and condensed to transfer heat.

Furthermore, Canadian Pat. No. 1,002,937 teaches a unit for recovering thermal energy which utilizes a plurality of heat pipes which are disposed horizontally and filled with a volume of working fluid sufficient to cause the liquid phase to travel in either direction of gravity, and circumferential capillary grooves in the side walls of the heat pipes transport of the liquid phase vertically above the liquid level to increase the area of the liquid-vapour interphase.

Moreover, Canadian Pat. No. 1,123,690 relates generally to heat exchange systems, and in particular to a gas-to-water heat recovery system which utilizes an array of heat pipes for collecting heat from a stream of heated gas and transferring the heat onto a volume of water for the production of steam.

With the rising cost of energy there is a continuing need for systems to recover heat energy during ventilation of air which is being replenished by fresh air, particularly in central air distribution systems.

SUMMARY OF THE INVENTION

In accordance with one aspect of the invention there is provided a heat recovery unit for use in associatin with a fluid distribution system including: a heat exchanger; and apparatus to circulate fluid through the system and to introduce fresh fluid across one end of the heat exchanger and into the system for mixing with the circulating fluid, and to ventilate a portion of the circulating fluid across the other end of the heat exchanger to transfer the thermal energy between the ventilated fluid and the fresh fluid so as to replenish the ventilated fluid with the fresh fluid.

In accordance with another aspect of the invention there is provided a heat recovery ventilator for use in association with a central air distribution system which includes; an enclosure having a fresh air inlet and ventilated air outlet; heat transfer means mounted within the enclosure; a blower communicating with the enclosure and the system so as to, circulate air through the system and to introduce fresh air through the fresh air inlet into the enclosure and across one end of the heat pipe and into the system for mixing with the circulating air and to ventilate a portion of the circulating air into the enclosure and across the other end of the heat transfer means so as to transfer thermal energy between the ventilated air and the fresh air so as to replenish the ventilated air with the fresh air.

In accordance with yet another aspect of this invention there is provided a heat recovery ventilator for use in association with an air duct in a central air distribution system including: an enclosure having a ventilation chamber and a fresh air chamber; heat pipe apparatus mounted within the enclosure so as to present one end thereof in the ventilation chamber and the other end thereof in the fresh air chamber; ventilation conduit communicating with the ventilation chamber of the enclosure; fresh air conduit communicating with the fresh air chamber of the enclosure; a first and second baffle projecting outwardly from the enclosure and adapted to cooperate with the duct so as to control the flow of air in the central air distribution system; the first baffle including an aperture; and a fan blower cooperating with the aperture of the first baffle and the enclosure so as to, circulate air from the duct through the first aperture, and introduce fresh air through the fresh air conduit into the fresh air chamber and across one end of the heat pipe, and through said first aperture for mixing with the circulating air, and to ventilate a portion of the circulating air around the second baffle into the ventilation chamber and across the other end of the heat pipe to transfer thermal energy between the ventilated air and the fresh air and force ventilated air through said ventilation conduit and out said distribution system, thereby replenishing the ventilated air with the fresh air.

The novel features which characterize the invention are defined by the appended claims. The foregoing and other aspects, advantages and features of the invention will hereafter appear, and for purposes of illustration of the invention, but not of limitation, an exemplary embodiment of the invention is shown in the appended drawings.

BRIEF DESCRIPTION OF THE DRAWINGS

FIG. 2 is a partial exploded perspective view of the heat recovery ventilator.

FIG. 6 is a perspective view of a device for controlling the damper in the fresh air chamber of the heat recovery ventilator.

DETAILED DESCRIPTION OF THE INVENTION

Figure 1:
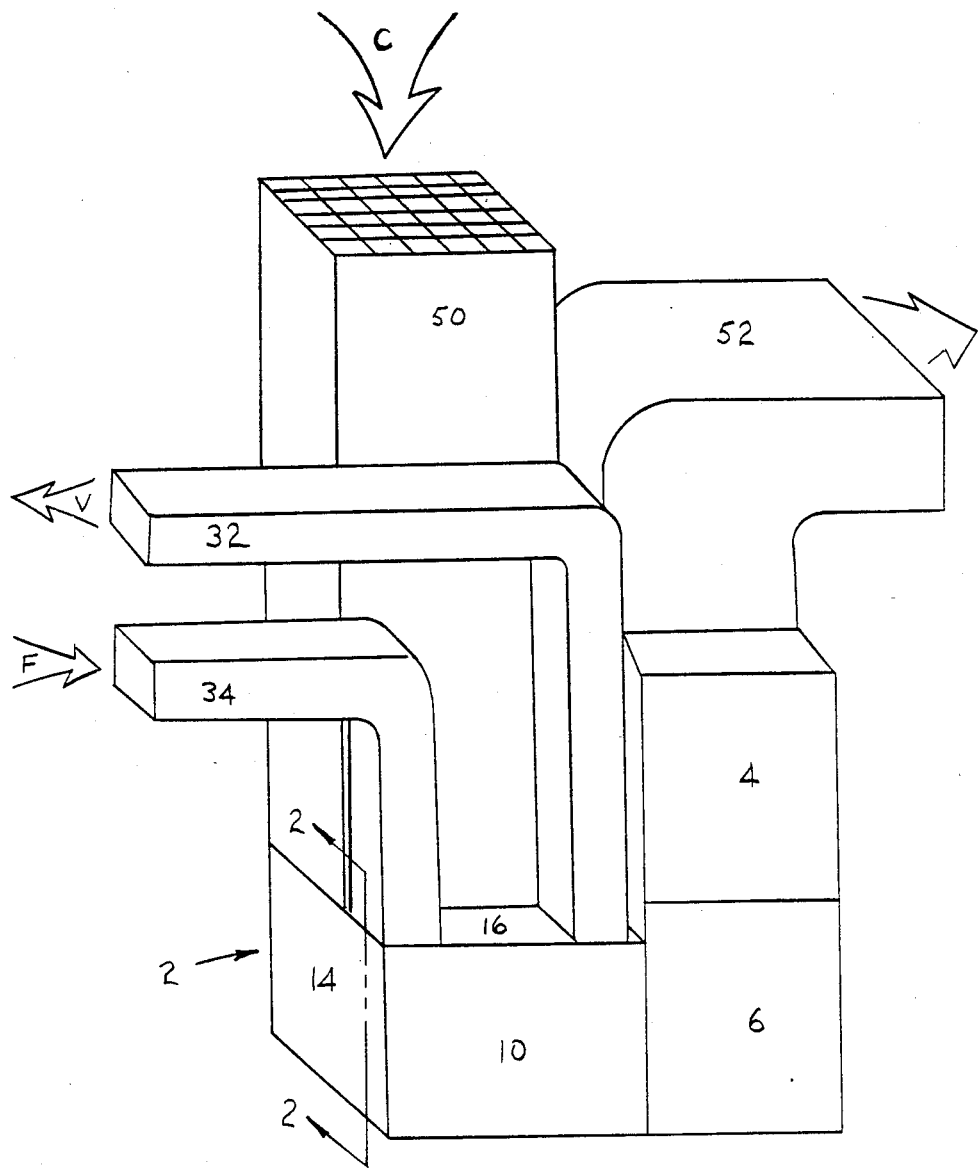
FIG. 1 is a perspective view of the heat recovery ventilator in association with a central air distribution system such as a furnace.

In the description which follows and in the several figures of the drawing, like parts are marked with the same reference numerals respectively.

FIG. 1 illustrates a heat recovery ventilator unit generally designated as 2, in combination with a central air distribution system 4 which in the preferred embodiment disclosed is a furnace 6.

Figure 3:
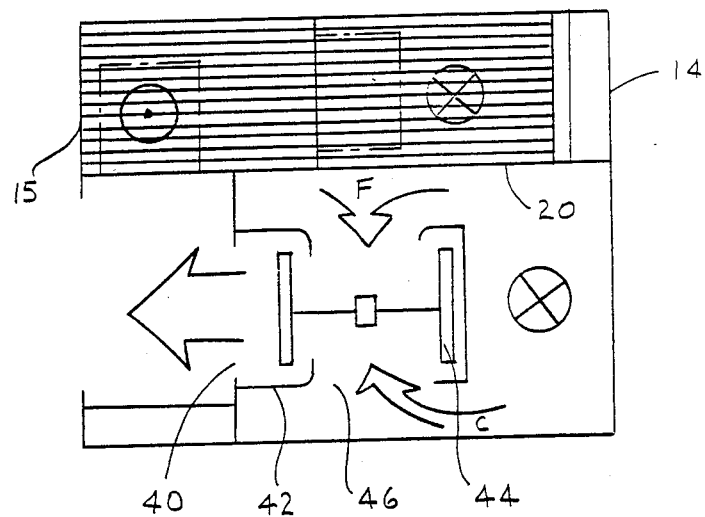
FIG. 3 is a top plan view of a cross section of the heat recovery ventilator taken along the line 1—1 of FIG. 2.

With reference to FIGS. 1, 2 and 3 the heat recovery ventilator unit 2 includes a housing defined by side walls 10 and 12, end walls 14 and 15, and a top 16 and bottom 18 respectively. End wall 15 includes an opening 80 which leads to the furnace 6.

The heat recovery ventilator 2 also includes an enclosure 8 which is bounded by top 16, side wall 10, a portion of end walls 14 and 15, and enclosure wall 20. The enclosure wall 20 presents openings 54 and 56. Walls 10, 12, 14, 15, 16 and 18 are comprised of sheet metal of corresponding thickness.

The enclosure 8 also includes a partition wall 22 so as to present a ventilation chamber 24 and a fresh air chamber 26. It should be noted from FIG. 5 that wall 23 spans between enclosure wall 20 and partition wall 22 so as to prevent any intermixing between ventilation chamber 24 and fresh air chamber 26.

The chambers 24 and 26 contain heat exchange means such as a series of heat pipes 28 which are arranged parallel to one another, and are located between end walls 14 and 15 of enclosure 8. The heat pipes 28 are well known to those skilled in the art and shall not be described in detail herein. Generally, however, the heat pipes 28 comprise a hollow pipe containing a working fluid which is alternatively evaporated and condensed to transfer heat or thermal energy in a manner which shall be described herein. The heat pipes 28 contain a series of spaced fins 30 to accommodate and increase the heat transfer characteristics.

It should be noted from FIG. 2 that one end of the heat pipes 28 is located in the ventilation chamber 24 and the other end is located in the fresh air chamber 26.

The heat pipes 28 are retained by apertures (not shown) in partition wall 22 in the manner so as to support the heat pipes 28 and so as to prevent any passage of air between the ventilation chamber 24 and fresh air chamber 26.

A ventilation conduit or pipe 32 communicates with ventilation chamber 24 and the atmosphere, while fresh air conduit or pipe 34 communicates with the fresh air chamber 26 and the atmosphere.

The enclosure 8 presents first and second baffles 36 and 38 which project generally perpendicularly outwardly from enclosure wall 20. First baffle 36 is disposed generally perpendicular to second baffle 38. The baffles 36 and 38 may be made from sheet metal and have a corresponding thickness.

First baffle 36 stretches between top 16 and bottom 18 and enclosure wall 20 and side wall 12; while second baffle 38 extends from enclosure wall 20 and terminates before side wall 12. Baffle 32 also presents a first aperture 40.

The heat recovery ventilator 2 also presents a blower fan unit 42 as shown in FIG. 1, which is associated with baffle 36 and the enclosure 8 in a manner which shall be described herein.

The heat recovery ventilator 2 is adapted to be used in association with a duct 50 in a central air distribution system 3 as best seen in FIG. 1.

The heat recovery ventilator is adapted to be inserted between the cold air return duct 50 of the central air distribution system 4 and the furnace 6. The heat recovery ventilator 2 is retained in such position by suitable fastening means (not shown).

The baffles 36 and 38 are adapted to co-operate with the duct 50 so as to control the flow of circulating air C in duct 50. The circulating air C is circulated through the hot air ducts 52 to the rooms of the home or office and then returned to the furnace or air conditioner through the cold air return ducts 50.

The operation of the heat recovery ventilator 2 in association with an air duct 50 of a central air distribution system may best be described by reference to FIGS. 2, 3, 4 and 5.

The blower unit 42 of heat recovery ventilator 2 may be switched on by suitable electrical means (not shown) such that that the fan blades 44 of blower 42 revolves so as to draw circulating air C into the opening 46 of blower 42, and through the first aperture 40 into the region bounded by baffles 36 and 38, top 16, side wall 12 and enclosure wall 20.

At the same time the blower 42 creates a low pressure zone adjacent opening 54 leading to the fresh air chamber 26 and causes fresh air F to be drawn through the fresh air conduit 34 across one end of the heat pipe 28 in the fresh air chamber 26, through opening 54 into the blower 42 and out of aperture 40 which causes the fresh air F to be mixed with the circulating air C. The mixture of the fresh air F and circulating air C will be directed toward the furnace 6.

Figure 4:
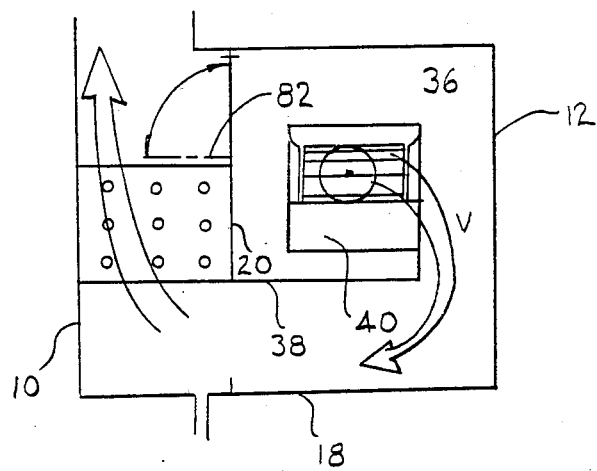
FIG. 4 is an end elevational view taken from the left side of FIG. 2.

As best seen in FIG. 4 a portion of the circulating air C will be ventilated around baffle 38, through opening 56 and across the other end of heat pipes 28.

If the furnace is operating, the ventilated air V is normally at a temperature which is higher than the incoming fresh air F. In order to minimize energy loss in the ventilated air V, the heat pipe 28 absorbs heat energy from the ventilated air V passing thereover, and such heat energy is transferred to the other end of the heat pipe 28 in the fresh air chamber 26 which is absorbed by the cooler fresh air F passing thereover. The fins 30 of heat pipe 28 increase the efficiency and the heat transfer rate.

If the air conditioner is operating, the ventilated air V is normally cooler than the incoming fresh air F. Accordingly as the fresh air F passes over one end of the heat pipes 28 in the fresh air chamber 26, heat energy is transferred to the other end of the heat pipe 28 in ventilation chamber 24, thereby heating the ventilated air V prior to being vented to the atmosphere, and at the same time cooling the incoming fresh air F. Such operation minimizes the costs of wasted energy when ventilating the circulating air C.

After the ventilated air passes over the ends of heat pipes 28 in ventilation chamber 24, it is vented to the atmosphere by the ventilation conduit 32.

The blower 42 therefore serves several functions, namely to circulate the circulating air C, introduce fresh air F, and to ventilate a portion of the circulating air. The amount of fresh air F introduced into the system will be balanced by the amount of air which is ventilated. For greater particularity, the blower 42 is the blower which is typically located in the furnace 6. Such blower is removed from furnace 6 and placed within said heat recovery ventilator 2. In this way one blower 42 is utilized to circulate air through the system, introduce fresh air and ventilate a portion of the circulating air. Furthermore, the heat recovery ventilator 2 is adapted to be integrally connected to the duct work 50 of a central air distribution system 4. Accordingly, cost savings are realized by utilizing one blower as well as the existing duct work of the central air distribution system 4.

The operation of the heat recovery ventilator 2 minimizes the energy loss when ventilating a portion of the circulating air C.

The enclosure 8 includes a damper 60 in fresh air chamber 26 which is operable to revolve about on axis 62 between an open and closed position so as to increase or decrease the flow of fresh air F over the ends of heat pipes 28 in a manner to be described herein. One end of the damper 60 is connected to a plunger 64 which is adapted to move in response to a temperature chamber so as to cause the damper 60 to revolve about axis 62.

In the preferred embodiment described in FIG. 6 the plunger 62 is adapted to move in a reciprocating fashion within one end of a cylindrical member 66. The other end of cylindrical member 66 is closed. The cylindrical member 66 contains a material which expands when cooled, such as water 68 which expands on freezing. The cylindrical member 66 also includes a bleed valve 70 to introduce water 68 into cylindrical member 66 or to bleed water 68 from the cylindrical member 66.

FIG. 6 also illustrates that the damper 60 includes a spring 72 which biases the damper in the open position whereby the end of damper 60 remote from the plunger 64 touches end wall 14 thereby directing all of the fresh air F to flow over the heat pipes 28 in fresh air chamber 24.

However if the ends of heat pipes 28 in fresh air chamber 26 accumulate frost during operation in the winter the water 68 in cylindrical member 66 will freeze causing the ice in the member 66 to expand and moving the plunger 64 outwardly. This movement will cause the damper 60 to rotate about axis 62 to its closed position, whereby the fresh air F will by-pass the heat pipes 28.

With the damper 60 closed, the heat extracted from the ventilated air V will be to transferred to the fresh air chamber 22 by means of the heat pipes 28 so as to eliminate the frost. Once the frost is eliminated the damper 66 would automatically open under the influence of the spring 72 as the ice in cylindrical member 66 will melt causing the plunger 64 to be drawn into the cylindrical member 66.

The heat recovery unit 2 may be equipped with fire dampers 72 which would automatically close the opening 80 and end wall 15 leading to the furnace 6 in the event that the temperature of the circulating air C reaches a critically high temperature, so as to force all air, namely fresh air F, and the circulating air C to be diverted through opening 56, and out of the ventilating circuit 32. Damper 73 is comprised of sheet metal or the like and has a corresponding thickness.

Moreover, the ventilation chamber 24 may contain fire damper 82 which are located in enclosure wall 20. The damper 82 is adapted to swing open as best seen in FIG. 4 in the event that the temperature of the circulating air C reaches a critically high temperature so as to improve the ventilating characteristics of the unit.

Figure 5:
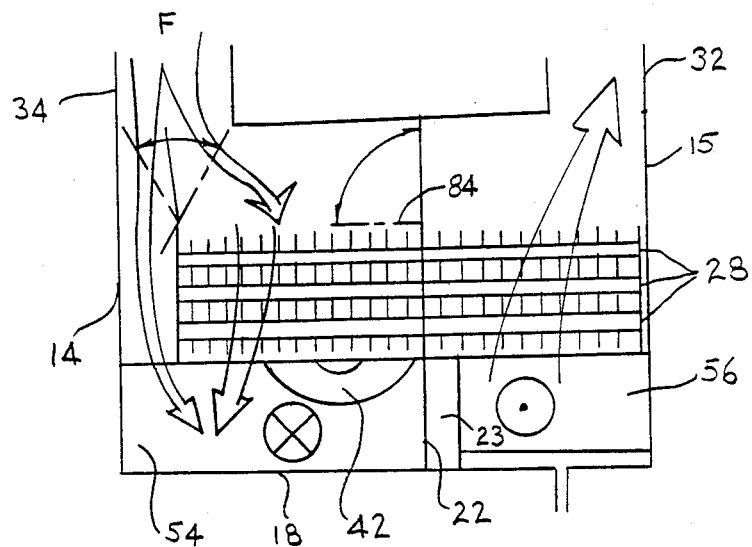
FIG. 5 is a partial cross section of the heat recovery ventilator taken along the line 2—2 of FIG. 1.

Furthermore, partition 22 may also be equipped with a fire damper 84 which would automatically swing open as best seen in FIG. 5 in the event that the circulating air C reaches a critically high temperature so that both the fresh air conduit 34 and the ventilating conduit 32 could vent the hot circulating air into the atmosphere.

Once the temperature of the circulating air C reaches its normal operating temperature, fire dampers 72 would be manually opened and dampers 82 and 84 would be closed.

Figure 7:
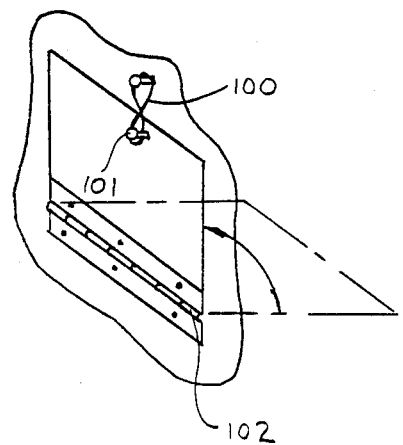
FIG. 7 shows a fire damper with a Bismuth, Lead, Tin or Cadmium alloy fuse.

Fire dampers 72, 82 and 84 may be activated by suitable sensing means such as a Bismuth, Lead, Tin or Cadmium Alloy fuse 100 as illustrated in FIG. 7. A suitable fuse is selected which is wrapped around straps 101. Upon reaching a critical temperature the fuse melts and the damper pivots about hinge 12 thereby opening the damper.

Bottom 18 in the region of ventilation chamber 24 is equipped with a drain hole 90 to drain any condensed water out of the ventilation chamber 24 through drain hose 92.

Although the invention has been described in association with a central air distribution system, other systems may be utilized, including systems based on any fluids, including liquids or other gases.

Moreover, although the preferred embodiment as well as the operation and use have been specifically described in relation to the drawings, it should be understood that variations in the preferred embodiment could easily be achieved by a man skilled in the art without departing from the spirit of the invention. Accordingly, the invention should not be understood to be limited to the exact form revealed by the drawings.

The embodiment of the invention in which an exclusive property or privilege is claimed are defined as follows:

1. A Heat Recovery Ventilator for use in association with an air duct in a central air distribution system including:
    (a) a housing integrally connected to and communicating with said air duct;
    (b) an enclosure located within said housing, said enclosure having a ventilation chamber and a fresh air chamber;
    (c) heat pipe means located within said enclosure so as to present one end thereof in said ventilation chamber and the other end thereof in said fresh air chamber;
    (d) a ventilation conduit means communicating with said ventilation chamber of said enclosure;
    (e) fresh air conduit means communicating with said fresh air chamber of said enclosure;
    (f) first baffle means extending exteriorly outwardly from said enclosure to said housing said first baffle means presenting an aperture there through;
    (g) second baffle means extending generally exteriorally outwardly from said enclosure and said first baffle means below said aperture to present an opening between said second baffle means and said housing, with said opening communicating with said ventilation chamber;

(h) a single blower co-operating with said aperture of said first baffle means and said enclosure so as to:
(i) circulate air through said air duct means of said central air distribution system through said first aperture means;
(ii) introduce fresh air through said fresh air conduit into said fresh air chamber and across one end of said heat pipe means and through said first aperture for mixing with said circulating air;
(iii) ventilate a portion of said circulating air around said second baffle through said opening into said ventilation chamber and across one end of said pipe means to transfer thermal energy between said ventilated air and said fresh air and force said ventilated air through said ventilation conduit and out said distribution system so as to replenish said ventilated air with said fresh air.

2. A heat recovery ventilator for use in association with a central air distribution system including:
(a) a housing integrally connected to and communicating with said air distribution system;
(b) an enclosure located within said housing, said enlosure having a fresh air inlet and a ventilated air outlet;
(c) heat transfer means mounted within said enclosure;
(d) first and second baffle means located in said housing adjacent said enclosure and adapted to allow:
(i) air to be circulated through said first baffle means and said system;
(ii) fresh air to be introduced through said first baffle means and said system;
(iii) a portion of said circulating air to be ventilated around said second baffle means and into said enclosure;
(e) blower means located in said housing and co-operating with said enclosure and said first and second baffle means so as to:
(i) circulate air through said first baffle means and said system;
(ii) introduce fresh air through said fresh air inlet into said enclosure and across one end of said heat transfer means through said first baffle means and into said system for mixing with said circulating air;
(iii) ventilate a portion of said circulating air around said second baffle means into said enclosure and across the other end of said heat transfer means so as to transfer thermal energy between said ventilated air and said fresh air so as to replenish said ventilated air with said fresh air;

3. A heat transfer ventilator for use in association with a central air distribution system including:
(a) a housing integrally connected to and communicating with said central air distribution system;
(b) an enclosure located within said housing, said enclosure having a fresh air inlet and a ventilated air outlet;
(c) heat transfer means located within said enclosure so as to present one end thereof adjacent said fresh air inlet and the other end thereof adjacent said ventilated air outlet;
(d) first baffle means extending exteriorly outwardly from said enclosure to said housing, said first baffle means presenting an aperture therethrough;
(e) second baffle means extending generally exteriorally outwardly from said enclosure and said first baffle means below said aperture to present an opening between said second baffle means and said housing, said opening communicating with said enclosure adjacent said ventilated air outlet;
(f) blower means co-operating with said aperture of said first baffle means and said enclosure so as to:
(i) circulate air through said air duct means of said central air distribution system through said first aperture means;
(ii) introduce fresh air through said fresh air inlet into said enclosure and across one end of said heat transfer means and through said first aperture for mixing with said circulating air;
(iii) ventilate a portion of said circulating air around said second baffle means through said opening into said enclosure and across the end of said heat transfer means to transfer thermal energy between said ventilated air and said fresh air so as to replenish said ventilated air with said fresh air.

4. A heat recovery ventilator for use in association with a central air distribution system including:
(a) a housing;
(b) an enclosure having a fresh air inlet and a ventilated air outlet;
(c) heat transfer means mounted within said enclosure;
(d) first and second baffle means located in said housing and adapted to allow:
(i) air to be circulated through said first baffle means and said system;
(ii) fresh air to be introduced through said first baffle means and said system;
(iii) a portion of said circulating air to be ventilated around said second baffle means and into said enclosure;
(e) blower means located in said housing and co-operating with said enclosure and said first and second baffle means so as to:
(i) circulate air through said first baffle means and said system;
(ii) introduce fresh air through said fresh air inlet into said enclosure and across one end of said heat transfer means through said first baffle means and into said system for mixing with said circulating air;
(iii) ventilate a portion of said circulating air around said second baffle means into said enclosure and across the other end of said heat transfer means so as to transfer thermal energy between said ventilated air and said fresh air so as to replenish said ventilated air with said fresh air.

5. A heat recovery ventilator for use in associatin with a central air distribution system including:
(a) a housing;
(b) an enclosure having a fresh air inlet and a ventilated air outlet;
(c) heat transfer means located within said enclosure so as to present one end thereof adjacent said fresh air inlet and the other end thereof adjacent said ventilated air outlet;
(d) first baffle means extending interiorally of said housing, said first baffle means presenting an aperture therethrough;
(e) second baffle means extending generally interiorally of said housing and co-operating with said first baffle means to present an opening between said second baffle means and said housing, said opening communicating with said enclosure and said ventilated air outlet;

(f) blower means co-operating with said aperture of said first baffle means and said enclosure so as to:

(i) circulate air through said air duct means of said central air distribution system through said first aperture means;

(ii) introduce fresh air through said fresh air inlet into said enclosure and across one end of said heat transfer means and through said first aperture for mixing with said circulating air;

(iii) ventilate a portion of said circulating air around said second baffle means through said opening into said enclosure and across the end of said heat transfer means to transfer thermal energy between said ventilated air and said fresh air so as to replenish said ventilated air with said fresh air.

6. A heat recovery ventilator as claimed in claim 2, wherein said fresh air chamber includes a damper operably moveable between an open and closed position so as to increase or decrease respectively the flow of fresh air through said heat pipe means in said fresh air chamber.

7. A heat recovery ventilator as claimed in claim 6 wherein said enclosure includes a cylindrical member adapted to retain material which expands in the vicinity of zero degrees centigrade, and a plunger one end of which is attached to said damper, and said other end of said plunger is adapted for slideable movement within said cylindrical member in response to a change in temperature, so as to move said damper to said closed position and decrease the flow of fresh air through said heat pipe means when said fresh air chamber approaches zero degrees centigrade and thereby transfer heat energy from said ventilation chamber to said fresh air chamber to raise the temperature in said fresh air chamber above zero degrees centigrade, and to move said damper to said open position and increase the flow of fresh air through said heat pipe means when the temperature of said fresh air chamber exceeds zero degrees centigrade.

8. A heat recovery ventilator as claimed in claim 7 wherein said material comprises water.

9. A heat recovery ventilator as claimed in claim 6 which includes a fire damper adjacent said first baffle means and adapted to close the opening to said duct during pre-set elevated temperature of said circulated air.

10. A heat recovery ventilator as claimed in claim 9 wherein said enclosure includes fire damper means which automatically open at a pre-set elevated temperature of said circulated air so as to ventilate substantially all of said circulated air out of said fresh air conduit means and said ventilated air conduit means.

11. A Heat Recovery Ventilator as claimed in claim 1 wherein said first baffle means extends generally perpendicularly exteriorally outwardly from said enclosure to said housing.

12. A Heat Recovery Ventilator as claimed in claim 11 wherein said second baffle means extends generally perpendicularly exteriorally outwardly from said enclosure and said first baffle means.

13. A Heat Recovery Ventilator as claimed in claim 12 wherein said enclosure presents a ventilation opening to said ventilation chamber, said ventilation opening communicating with said opening between said second baffle means and said housing.

14. A Heat Recovery Ventilator as claimed in claim 13 wherein said enclosure presents a fresh air opening to said fresh air chamber, said fresh air opening communicating with said aperture in said first baffle means.

* * * * *